Figure 1:
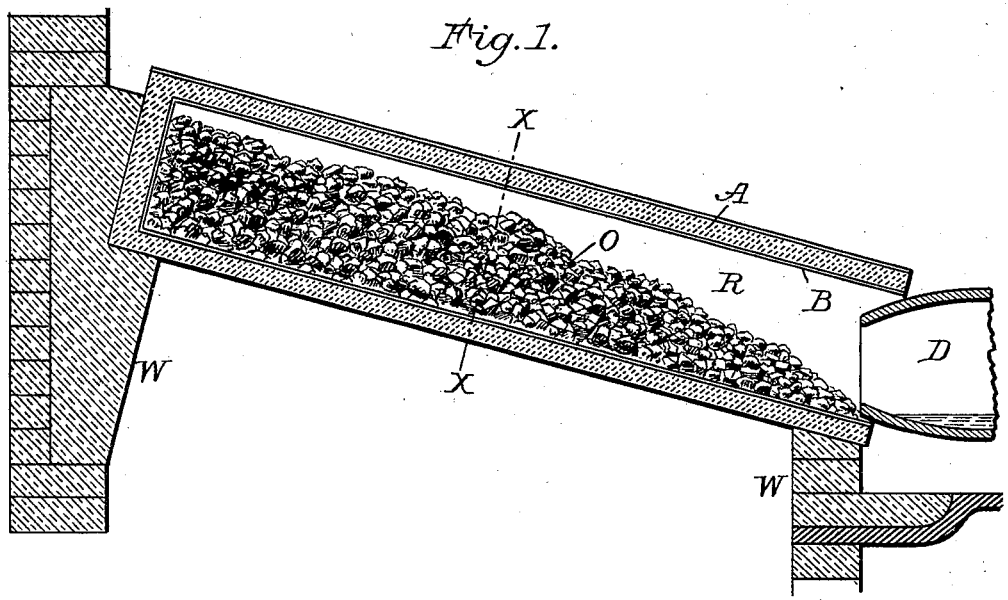

No. 642,722. Patented Feb. 6, 1900.
B. SADTLER.
RETORT.
(Application filed July 13, 1899.)
(No Model.)

Attest:

Inventor:
Benjamin Sadtler

UNITED STATES PATENT OFFICE.

BENJAMIN SADTLER, OF DENVER, COLORADO, ASSIGNOR TO ALBERT G. CLARK, OF CINCINNATI, OHIO.

RETORT.

SPECIFICATION forming part of Letters Patent No. 642,722, dated February 6, 1900.

Application filed July 13, 1899. Serial No. 723,699. (No model.)

*To all whom it may concern:*

Be it known that I, BENJAMIN SADTLER, of the city of Denver, county of Arapahoe, and State of Colorado, have invented certain new and useful Improvements in Retorts, of which the following is a specification.

The object of my invention is to produce retorts adapted to the distillation of ores containing such a percentage of zinc as to prevent their economical treatment in ordinary precious-metal-smelting furnaces and such a percentage of oxid of iron or other corrosive bases as to prevent their economical treatment in the retorts of ordinary zinc-distilling furnaces. Valuable quantities of precious metals, such as gold and silver, are often contained in ores of this character; but the iron oxid, &c., excludes their reduction by the means used in zinc distillation, since the iron oxid when exposed to the heat required for such distillation slags with and corrodes the fire-clay of which the retorts are composed, destroying them. If, on the other hand, an effort be made to treat the zinc-bearing ore in the blast-furnaces used for the smelting of ores carrying precious metals, the zinc, being vaporized and encountering the air-blast, is precipitated as a crust upon the walls of the furnace, gradually choking it, obstructing and finally stopping the operation of the furnace. In consequence of the above-named conditions there are large quantities of such ores containing gold and silver and other metals having both iron oxid and zinc (each valuable if separated) which it has been impossible economically work either by zinc distillation or by blast-furnace smelting, and which, therefore, have remained as waste. I have discovered that by applying before burning to the interior and exposed surface of the fire-clay retorts commonly used in zinc distillation a smearing or coating of a sintering material, such as a silicate of soda or equivalent substance, and covering the same with a coating of basic material, preferably having also on its adjacent surface or mixed with it a small percentage of said sintering material, and then subjecting the entire body to a firing in a kiln or zinc-furnace under a heat of such intensity and duration as to fuse the sintering material with the adjacent fire-clay on the one hand and basic material on the other, I can so interlock this lining or coating of basic material with the fire-clay body of the retort as to produce a practically solid cohering retort capable of sustaining the heat to which it is exposed in use and impervious to the oxid of iron or other corroding ingredients of the ores to be treated. The silicate of soda when subjected to the heat above mentioned in connection with the silicate of alumina of the body of the retort and the basic material with which it is also in contact forms a chemical union between the fire-clay of the retort, on the one hand, and the magnesia or other basic material composing the lining or coating, on the other hand, thereby sintering together or interlocking the substances constituting the body and the lining or coating, respectively, and a surface of basic material is produced capable of withstanding the action of the oxids of iron or other chemical agents in the ores at the heat of distillation of the zinc ore and which is also capable of resisting the abrasion from the ores and tools used upon it, to which the surface of such retorts is necessarily exposed. The sintering material serves, further, by its chemical reaction to lock together and give substantial coherence to the basic materials composing the lining or coating. The heat applied being sufficient to develop the chemical affinity between the sintering material and particles of each of the adjacent materials, such chemical union is formed as makes the retort practically integral as distinguished from one composed of walls of independent material, while at the same time such chemical action between the basic material and the fire-clay as would destroy their several properties or produce disastrous fusion is avoided, the product having, without undue thickness, the requisite tensile strength and refractory character. The basic material being so bound together and to the inner wall that it cannot peel off or fracture, affords a perfect protection against corrosion as well as abrasion, and heat is transmitted through the walls without the impediment incident to a series of walls of different materials mechanically attached to each other, a matter of special importance, since the retort must be capable of readily transmitting heat applied without to operate upon the materials within. Assuming, for illustration, that the basic material used is magnesia and in the form of calcined magnesite and the sintering material is a solution of silicate of sodium, (commonly known in the trade as "silicate of soda,") this silicate of sodium at proper temperature combines with the portions of the fire-clay retort nearest to the lining, forming a thin layer of silicate of sodium and aluminium, which is a definite chemical compound (virtually porcelain) which only softens slightly at high temperatures sufficiently to produce an adherence on the part of the lining. Its presence is usually indicated by a white line. The silicate of sodium has at the same time, through its chemical affinity for the magnesia, formed a film of silicate of sodium and magnesia by which the magnesia lining is bound together and to the fire-clay body, while the interior surface is strongly basic and safeguarded against any tendency to peel or fracture off. When the double silicates thus formed complete their chemical saturation, they solidify or set. As before indicated, it is important to limit the amount of silicate of sodium, (or other sintering material,) since their fusibility would if used in too large quantity produce a condition of fluidity, and this condition of fluidity, if carried to excess, might start an intermingling of the basic particles of the lining and the acid particles of the retort, tending to destroy the retort or impair its refractory quality. Basic materials having little or no chemical affinity for water are preferable. If the basic lining were applied to the fire-clay retort without this process of sintering the substances together, it would be practically incapable of resisting the abrasion to which such retorts treating such ores are necessarily subjected and would not have the same capacity to resist the action of iron oxids. I prefer to apply the silicate of soda or other substance having the necessary chemical affinity as a wash or thin coating to the inner surface of the dried but unburnt fire-clay of the retort, then allow it to soak in somewhat before applying the basic material, and to mix a small percentage of the sintering material with the basic lining before or when applying it to the surface thus washed or coated; but the essential considerations are to insure the presence of the sintering material on the line of juncture between the fire-clay body and basic lining or coating and the subsequent firing, whereby the desired interpenetration and chemical bond is secured. I prefer to use the basic material pulverized to about the degree of fineness corresponding to a mesh of twenty to an inch and to reject the fine dust, which tends to absorb an undue quantity of sintering material. I treat in the same manner the outer top surface of the retorts, since when one of the series of retorts is broken during the operation the hot ore falling upon the retort below would be liable to destroy it if not thus shielded.

A retort constructed in accordance with my invention is illustrated in the accompanying drawings, wherein—

Figure 2:
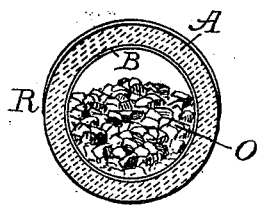
Figure 3:
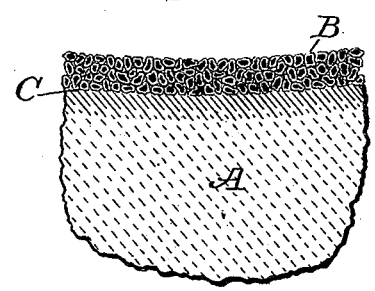

Figure 1 is a vertical section taken lengthwise and centrally through the retort when in position in the furnace; Fig. 2, a cross-section on line X X, Fig. 1; and Fig. 3, a cross-section through a fragment of the retort, somewhat magnified.

R represents the retort; A, the fire-clay portion; B, the lining; C, the zone of sintering material which has been chemically united to both A and B and become set.

W represents the walls of the furnace, and D a portion of the condenser, which is luted into the retort, so as to form an air-tight joint.

O represents the charge of ore in the retort.

The retort is usually about eight inches internal diameter and about four feet in length, the basic lining about one-eighth of an inch in thickness, (sometimes slightly more at the bottom,) the fire-clay about one inch in thickness, and the sintering material as applied about one thirty-second ($\frac{1}{32}$) of an inch, but is considerably reduced below this after the chemical combination with adjacent materials has taken place as the result of fire. The fire-clay body I compose of the ordinary fire-clay mixture molded into the shape above indicated, and it is then dried but not fired before the application of the sintering material and basic lining.

I have found that a heat of about 1500° Fahrenheit continued for two or three days is desirable for the firing after the materials above mentioned are brought together, and a higher degree of heat or longer time may be used to advantage. Less perfect results may be obtained where less heat is used or the duration of firing shortened. It is desirable to have the basic material at least an eighth of an inch thick. It may be composed of dolomite, magnesia, titanic iron ore, corundum, or other refractory and infusible basic materials, or two or more of such materials mixed. The sintering material should be a small percentage, not more than from ten per cent. to twenty per cent. of the entire lining.

The process for making these retorts is covered by a division of this application.

I claim—

1. A retort for reducing ore and analogous purposes having a body of fire-clay, a lining or coating of basic material and a sintering material between said body and coating chemically united to each, substantially as described.

2. A retort for the purposes set forth having a body of fire-clay with its interior and upper outer surfaces coated with a basic material, and a coating of sintering material between the body of said retort and said basic material, chemically united to each, substantially as described.

3. A retort for reducing ores and analogous purposes having a body of fire-clay, a lining of basic material, and a coating of silicate of soda between said body and lining chemically united to each, substantially as described.

BENJAMIN SADTLER.

Witnesses:
ALBERT G. CLARK,
M. SINCLAIR.